United States Patent [19]

Okada et al.

[11] 4,127,417

[45] Nov. 28, 1978

[54] METHOD FOR IMPROVING WORKABILITY OF FRESH FIBER CONTAINING CEMENT MORTAR AND CONCRETE

[75] Inventors: Eizaburo Okada, Wakayama; Kenichi Hattori, Musashino, both of Japan

[73] Assignee: Kao Soap Co., Ltd., Tokyo, Japan

[21] Appl. No.: 853,479

[22] Filed: Nov. 21, 1977

[30] Foreign Application Priority Data

Nov. 22, 1976 [JP] Japan .................. 51-141001

[51] Int. Cl.² ............................................. C04B 7/02
[52] U.S. Cl. .................................................... 106/99
[58] Field of Search ............................. 106/99, 314

[56] References Cited

U.S. PATENT DOCUMENTS

| | | | |
|---|---|---|---|
| 3,622,361 | 11/1971 | Bolton et al. | 106/99 |
| 3,661,603 | 5/1972 | Nicol | 106/99 |
| 3,676,541 | 7/1972 | Nishi et al. | 106/314 |
| 3,677,780 | 7/1972 | Nishi et al. | 106/314 |
| 3,679,445 | 7/1972 | Howe | 106/99 |
| 3,933,515 | 1/1976 | Yang | 106/99 |

*Primary Examiner*—James Poer
*Attorney, Agent, or Firm*—Blanchard, Flynn, Thiel, Boutell & Tanis

[57] ABSTRACT

Fiber-containing cement mortar and concrete are improved by adding a salt of a β-naphthalenesulfonic acid-formaldehyde high condensate when the ingredients of the fiber-containing cement mortar or concrete are mixed in order to improve the workability of the fresh fiber-containing cement mortar or concrete whereby the physical properties of the resulting hardened cement mortar or concrete are improved.

10 Claims, No Drawings ized in that a salt of a β-naphthalenesulfonic acid-formaldehyde high condensate (hereinafter referred

METHOD FOR IMPROVING WORKABILITY OF FRESH FIBER CONTAINING CEMENT MORTAR AND CONCRETE

BACKGROUND OF THE INVENTION

1. Field of the Invention

The present invention relates to a method for improving fiber-containing cement mortar and concrete, characterized in that a salt of a β-naphthalenesulfonic acid-formaldehyde high condensate (hereinafter referred to as "NSF") is added as a cement dispersant or water-reducing agent for cement when the ingredients of a fiber-containing cement mortar or concrete are mixed, thereby to improve the workability of the fresh fiber-containing cement mortar or concrete and to improve the physical properties of the resulting cement mortar or concrete.

2. Description of Prior Arts

Civil engineering construction materials including cement have very excellent properties, but they are still insufficient in various points. Various research works have been made on the incorporation of metal fibers, glass fibers and processed natural and synthetic fibers in mortar or concrete so as to overcome some of these defects, for example, poor tensile strength, poor flexural strength, insufficient deformability, insufficient impact resistance and poor crack resistance. Practically, however, it is difficult to attain sufficient fiber-reinforcing effects on the physical properties of a mortar or concrete obtained using a selected cement or concrete composition, simply by incorporating the fibers under the same mixing conditions as those adopted for mixing the ingredients for a fiber-free cement mortar or concrete. Namely, if mixing conditions considered to be appropriate for ordinary fiber-free mcrtar or concrete are adopted in preparing fiber-containing mortar or concrete and the fibers are merely incorporated under such mixing conditions, the workability is drastically degraded. More specifically, while fiber-containing mortar or concrete is being mixed, horse dung-like fiber masses called "fiber balls" are formed locally here and there in the mortar or concrete. If such fiber balls are present, the workability of the fresh mortar or concrete is extremely lowered and filling or placing of the mortar or concrete into a molding form becomes impossible, and even if such mortar or concrete is forcibly filled or placed, the incorporated fibers are not uniformly dispersed in the mortar or concrete and the expected reinforcing effects cannot be attained. p As means for overcoming the difficulties caused by a reduction of the workability when fibers are incorporated into mortar or concrete, there have been adopted a method in which mechanical means is employed and a method in which the composition of the ingredients of the mortar or concrete is changed. According to the former method, for example, spraying using a sprayer or the like is conducted at the forming step, or a special mixer or fiber dispenser is used at the mixing step. According to the latter method, for example, the proportion of fine aggregate is increased, round gravel is used as a coarse aggregate, the maximum size of the coarse aggregate is diminished, the unit amount of cement is increased, fly ash is added, or the water-cement ratio is increased. Even if the foregoing methods are adopted, however, no satisfactory workability-improving effect can be obtained. Further, when the composition is changed, some of the inherent properties of the mortar or concrete are lost and the application fields are inevitably limited. Furthermore, as will be apparent from the Examples given hereinafter, when fibers are not incorporated, fresh concrete which can easily be fed by a pump under a predetermined consistency can be obtained. However, if fibers are incorporated, this pressure feeding by the pump becomes very difficult and the consistency of the fresh concrete is lowered. If water is further added to this composition (namely, the unit amount of water is increased and the water-cement ratio is made higher), the consistency is restored to the original good state of the fresh concrete having good workability. However, in this case, mechanical characteristics, such as flexural strength after 28 days and compression strength after 28 days, are not improved by incorporation of the fibers in comparison with those of fiber-free concrete.

SUMMARY OF THE INVENTION

As a result of research works made with a view to developing a method for preparing fiber-reinforced mortar or concrete in which the workability of the fresh fiber-incorporated mortar or concrete can be sufficiently improved without degradation of the inherent properties of the mortar or concrete, we have now completed the present invention.

According to the present invention, when fiber-containing mortar or concrete is prepared, and NSF, which is known as a cement dispersant or water-reducing agent for concrete, is added, there is obtained a fresh mortar or concrete having good workability, without making any other substantial change of the composition of the ingredients. According to the method of the present invention, the incorporated fibers can be dispersed sufficiently uniformly in the mortar or concrete without any substantial change of the composition of ingredients, and therefore, the properties expected of fiber-free mortar or concrete can be entirely retained and the expected reinforcing effects of the fibers on the physical properties of the mortar or concrete can be sufficiently manifested.

In the case of glass fiber-reinforced mortar or the like formed by the spraying method, a composite material can be obtained without the step of mixing fibers with the ingredients of the mortar or concrete and mixing may be accomplished according to a customary mixing method. Accordingly, in the case of the spraying method, a cement dispersant may be mixed with other ingredients according to customary procedures. However, in the premix method in which the ingredients of the mortar or concrete and the fibers are simultaneously mixed, the foregoing difficulties are still left unsolved, and in such case, the method of the present invention can be effectively applied.

NSF that is used in the present invention is well-known as a cement dispersant or water-reducing agent for concrete (see, for example, Japanese Patent Publication No. 11737/66). In order to impart other improvements in addition to the improvements intended in the present invention by the addition of NSF, at least one member selected from additives and chemicals may be incorporated in practising the method of the present invention.

In the present invention, NSF may be added according to methods which are substantially the same as those customarily adopted for application of a cement dispersant at the step of mixing the ingredients of concrete. More specifically, in the present invention, NSF can be incorporated according to any of (1) the simultaneous addition method in which NSF is added in the state of being dissolved in water for mixing with other ingredients, (2) the divided addition method in which NSF is added separately at an appropriate time, and (3) the post addition method in which NSF is added after cement has been contacted with water. It must be noted that when the last-mentioned method is adopted, fiber balls are formed relatively easily as compared with the former two methods.

It is known that in mixing fibers with ingredients, if the time for contact of the fibers with a cement paste is long, fiber balls are readily formed. Accordingly, in preparing fiber-containing mortar or concrete, attention is paid to the order of charging of the respective ingredients, and a method in which fibers are added finally or cement is charged finally is adopted most popularly. In the practical operation, the time of addition of NSF is sometimes limited by the above-mentioned order of addition of the ingredients.

Any concrete mixers customarily used for mixing concrete can be conveniently used for preparing fiber-containing mortar or concrete according to the present invention, though under some special mixing conditions a specific mixer must be used. In general, in the present invention, better results are obtained when a tilting mixer is employed. For example, as illustrated in the Examples given hereinafter, when a predetermined amount of steel fibers is incorporated into a certain composition and mixing is carried out by a 55 l-capacity drum mixer, the motor is stopped immediately after the start of the mixing operation. In contrast, when a 70 l-capacity tilting mixer is used for the same composition, the mixing operation can be accomplished conveniently without any trouble. When glass fibers are incorporated and mixing is carried out by using a drum mixer, the fibers are damaged and broken and the intended physical properties cannot be obtained in the resulting hardened mortar or concrete. However, when a drum mixer is used, the efficiency of charging of fibers is higher than when a tilting mixer is used. As pointed out hereinbefore, in preparing fiber-containing mortar and concrete, various mixing machines, ingredient compositions and mixing orders may be adopted according to the kind and use of the fiber-reinforced mortar or concrete. The present invention can be effectively applied to any of these modifications.

The present invention will now be described in detail by reference to the following Examples. The test methods adopted in these Examples are as follows.

(1) Ingredients used and properties of mixers:
 (i) Cement: C
  Onoda ordinary Portland cement: i (used when steel fibers were incorporated)
  Chichibu high-early-strength Portland cement: j (used when glass fibers were incorporated)
 (ii) Fine aggregate: S
  Produced at Kinokawa, FM = 2.72
 (iii) Coarse aggregate: G
  Crushed gravel produced at Takarazuka, maximum size = 20 mm, FM = 6.67, A = S + G
 (iv) Fibers: F
  Commercially available steel fibers: l 0.5 mm × 0.5 mm × 30 mm
  Commercially available steel fibers: m 0.25 mm × 0.55 mm × 25 mm (nonuniform wave configuration)
  Commercially available glass fibers: n 25 mm
 (v) Cement dispersant: D
  β-naphthalenesulfonic acid-formaldehyde high condensate salt: a
  Sodium melamine-formaldehyde condensate sulfonate: b
  Lignin-sulfonic acid type dispersant: c
  Sodium gluconate: d
  Mixture of β-naphthalenesulfonic acid-formaldehyde high condensate and sodium gluconate: e
 (vi) Water: W
  Service water
 (vii) Mixer: M
  55 l-capacity drum mixer: Y
  70 l-capacity tilting mixer: Z (2) After mixing, retempering is conducted sufficiently, and the resulting paste is filled in a form and vibrating compaction is carried out by using a rod type vibrator. The formed structure is taken out of the form after 1 day from the mixing operation and aged in water at 20° C. for a predetermined period of days. Then, the strength characteristics are determined.

(3) The physical properties of fresh mortar and concrete and hardened mortar and concrete are determined according to the following methods. The same measurement methods are employed when fibers are incorporated and when fibers are not incorporated.
 (i) Consistency: JIS A-1101
 (ii) Air content: JIS A-1128
 (iii) Tear strength: JIS A-1113
 (iv) Compression strength: JIS A-1114
 (v) Flexural strength: JIS A-1106
 (vi) Deformability:

In determining the flexural strength of hardened mortar or concrete, the load-displacement curve is automatically recorded, and the area for further 1.5 mm displacement over the displacement between pressing plates providing the final strength is determined and the required energy is defined as deformability.

EXAMPLE 1

Final compositions of ingredients and properties of fresh concretes are shown in Table 1, the mixing methods are shown in Table 2, and physical characteristics of hardened concretes are shown in Table 3.

Table 1

| | | | | | | | | | | | |
|---|---|---|---|---|---|---|---|---|---|---|---|
| Final Compositions of Ingredients and Properties of Fresh Concretes in Example 1 ||||||||||||
| Run No. | W/C (%) | S/A (%) | C Kg/m³ | W Kg/m³ | S Kg/m³ | G Kg/m³ | F Kind | F Kg/m³ | D Kind | D % × C | Air Content (%) | Final Slump (cm) |
| 1 | 71 | 59 | 300 | 212 | 1028 | 728 | — | — | — | — | 1.8 | 16.3 |
| 2 | 80 | 59 | 290 | 233 | 993 | 703 | l | 86 | — | — | 1.2 | 15.3 |
| 3 | 71 | 59 | 297 | 209 | 1017 | 721 | l | 88 | a | 0.16 | 1.7 | 16.3 |
| 4 | 69 | 59 | 298 | 205 | 1022 | 724 | l | 88 | a | 0.48 | 1.8 | 15.0 |

Table 2

Mixing Methods in Example 1

| Run No. | Order of Addition of Ingredients | Method of Addition of Dispersant | Mixer |
|---|---|---|---|
| 1 | C,S,G,W $\xrightarrow{\text{2 minutes}}$ + W $\xrightarrow{\text{1 minute}}$ | — | Y |
| 2 | C,S,G,F,W $\xrightarrow{\text{2 minutes}}$ + W $\xrightarrow{\text{1 minute}}$ | — | Y |
| 3 | C,S,G,F,W $\xrightarrow{\text{2 minutes}}$ + D $\xrightarrow{\text{1 minute}}$ | post addition | Y |
| 4 | C,S,G,F,D,W $\xrightarrow{\text{2 minutes}}$ + W $\xrightarrow{\text{1 minute}}$ | simultaneous addition | Y |

Table 3

Physical Characteristics of Hardened Concretes in Example 1

| Run No. | Tear Strength 7 days Kg/cm$^2$ | Tear Strength 28 days Kg/cm$^2$ | Flexural Strength 7 days Kg/cm$^2$ | Compression Strength 28 days Kg/cm$^2$ |
|---|---|---|---|---|
| 1 | 18.0 | 22.9 | 40.7 | 283 |
| 2 | 17.4 | 28.3 | 38.0 | 244 |
| 3 | 21.2 | 33.4 | 53.3 | 287 |
| 4 | 28.1 | 38.3 | 53.9 | 364 |

In run No. 2, when 1.1% by volume of steel fibers *l* were incorporated in the composition of run No. 1 (slump = 16.3 cm), the slump was reduced to 7.6 cm. Accordingly, water alone was added to restore the slump to 15.3 cm. In run No. 3, when 1.1% by volume of steel fibers *l* were added, the slump was reduced to 8.2 cm. Accordingly, the cement dispersant a was added in an amount of 0.16% based on the cement to restore the slump to 16.3 cm. In run No. 4, the water-cement ratio was further lowered below the water-cement ratio in run No. 3, and the dispersant a in an amount of 0.48% based on the cement was added simultaneously with water to be mixed but the intended consistency could not be obtained. Accordingly, a small amount of water was added so that the slump was restored to 15.0 cm.

As will be apparent from the results shown in Table 3, in the fiber-containing concretes, when compared under the same slump condition, the strength is apparently increased by addition of the dispersant although no increase of the strength is attained when the dispersant a is not used.

EXAMPLE 2

Final compositions of ingredients and properties of fresh concretes are shown in Table 4, the mixing methods are shown in Table 5, and physical characteristics of hardened concretes are shown in Table 6.

Table 4

Final Compositions and Physical Properties of Fresh Concretes in Example 2

| Run No. | W/C (%) | S/A (%) | C Kg/m$^3$ | W Kg/m$^3$ | S Kg/m$^3$ | G Kg/m$^3$ | F kind | F Kg/m$^3$ | D kind | D % × C | Air Content % | Final Slump (cm) |
|---|---|---|---|---|---|---|---|---|---|---|---|---|
| 5 | 45 | 60 | 500 | 225 | 924 | 621 | m | 156 | a | 0.43 | mixing impossible | |
| 6 | 50 | 60 | 500 | 250 | 884 | 595 | — | — | — | — | 2.6 | 7.0 |
| 7 | 45 | 60 | 500 | 225 | 924 | 621 | m | 156 | a | 0.43 | 2.3 | 9.6 |
| 8 | 42 | 60 | 500 | 210 | 945 | 637 | m | 156 | a | 0.64 | 2.4 | 5.5 |

Table 5

Mixing Methods in Example 2

| Run No. | Order of Charging of Ingredients | Method of Addition of Dispersant | Mixer |
|---|---|---|---|
| 5 | S,G,F $\xrightarrow{\text{1 minute}}$ + W + D $\xrightarrow{\text{1 minute}}$ +C $\rightarrow$ mixing impossible | simultaneous addition | Y |
| 6 | S,G,F $\xrightarrow{\text{1 minute}}$ + W + D $\xrightarrow{\text{1 minute}}$ + C $\xrightarrow{\text{2 minutes}}$ | " | A |
| 7 | S,G,F $\xrightarrow{\text{1 minute}}$ + W D $\xrightarrow{\text{1 minute}}$ + C $\xrightarrow{\text{2 minutes}}$ | " | Z |
| 8 | S,G,F $\xrightarrow{\text{1 minute}}$ + W D $\xrightarrow{\text{1 minute}}$ + C $\xrightarrow{\text{2 minutes}}$ | " | Z |

Table 6

Physical Properties of Hardened Concretes in Example 2

| Run No. | Tear Strength (Kg/cm$^2$) (28 days) | Compression Strength (Kg/cm$^2$) (28 days) |
|---|---|---|
| 5 | — | — |
| 6 | 59.0 | 506 |
| 7 | 64.7 | 558 |
| 8 | 66.7 | 597 |

In runs Nos. 5 and 7, the same composition was used. Results of these runs indicate that even if the dispersant a is employed, mixing is sometimes impossible depending on the kind of the mixer used. When results of run No. 8 are compared with those of run No. 6, it is apparent that the mechanical strength characteristics can be improved by addition of the dispersant a.

EXAMPLE 3

Final compositions and properties of fresh concretes are shown in Table 7, and mechanical characteristics of hardened concretes are shown in Table 8. Mixing was carried out in the following manner.

Fine aggregate, coarse aggregate and steel fibers (fly ash in run No. 21) were simultaneously charged and they were mixed for 1 minute. Then, water containing admixtures was then charged and mixed with the above ingredients for 1 minute. Finally, cement was charged and mixing was conducted for 2 minutes.

are brought about. For example, when the dispersant $b$ is used, in order to attain the same degree of improvement of the workability, it must be used in an amount 2 times the amount of the dispersant $a$, and this dispersant $b$ is not advantageous from the economical viewpoint. When the dispersant $c$ is employed, a very large quantity of air is entrained, and the compression strength is drastically degraded. When the dispersant $d$ is used, Table 7

| | | | Final Compositions and Physical Properties of Fresh Concretes in Example 3 | | | | | | | | | |
|---|---|---|---|---|---|---|---|---|---|---|---|---|
| Run No. | W/C (%) | S/A (%) | C Kg/m$^3$ | W Kg/m$^3$ | S Kg/m$^3$ | G Kg/m$^3$ | F kind | F Kg/m$^3$ | D kind | D %xC | Air Content (%) | Final Slump (cm) |
| 9  | 30 | 60  | 529 | 159 | 970 | 660 | 1 | 118 | a | 1.85 | mixing impossible | |
| 10 | 35 | 60  | 495 | 173 | 980 | 667 | — | —   | a | 0.50 | 3.5  | 16.2 |
| 11 | 35 | 60  | 478 | 168 | 947 | 644 | 1 | 115 | a | 1.05 | 5.3  | 13.5 |
| 12 | 40 | 60  | 465 | 186 | 991 | 673 | — | —   | a | 0.21 | 2.5  | 8.1  |
| 13 | 40 | 60  | 442 | 177 | 942 | 640 | 1 | 115 | a | 0.84 | 5.8  | 17.5 |
| 14 | 40 | 60  | 445 | 178 | 952 | 645 | 1 | 115 | a | 0.42 | 5.2  | 9.0  |
| 15 | 50 | 60  | 406 | 203 | 986 | 671 | — | —   | — | —    | 2.9  | 13.8 |
| 16 | 50 | 60  | 403 | 202 | 978 | 665 | 1 | 119 | a | 0.21 | 2.2  | 8.6  |
| 17 | 40 | 60  | 456 | 182 | 976 | 661 | 1 | 118 | b | 0.85 | 2.8  | 9.3  |
| 18 | 40 | 60  | 415 | 166 | 889 | 602 | 1 | 108 | c | 0.50 | 11.5 | 11.3 |
| 19 | 40 | 60  | 458 | 183 | 980 | 664 | 1 | 119 | d | 0.21 | 2.4  | 5.3  |
| 20 | 40 | 60  | 444 | 178 | 951 | 644 | 1 | 115 | e | 0.34 | 5.3  | 8.0  |
| 21 | 50 | 60* | 400 | 200 | 917 fly ash 59 | 660 | 1 | 110 | — | — | 3.1 | 3.6 |
| 22 | 40 | 60  | 440 | 176 | 941 | 637 | 1 | 153 | a | 0.67 | 5.8  | 10.1 |
| 23 | 40 | 60  | 455 | 182 | 967 | 659 | m | 118 | a | 0.84 | 3.1  | 7.5  |

*fly ash was calculated as S.

Table 8

Mechanical Characteristics of Hardened Concretes in Example 3

| Run No. | Flexural Strength (Kg/cm$^2$) | | Deformability (ton . mm) | |
|---|---|---|---|---|
| | 7 days | 28 days | 7 days | 28 days |
| 9  | —  | —  | —    | —    |
| 10 | 63 | 75 | 0.98 | 1.15 |
| 11 | 69 | 81 | 3.12 | 3.06 |
| 12 | 58 | 66 | 0.90 | 1.03 |
| 13 | 68 | 74 | 3.73 | 3.04 |
| 14 | 66 | 73 | 3.84 | 3.79 |
| 15 | 49 | 58 | 0.72 | 0.81 |
| 16 | 56 | 58 | 3.80 | 2.81 |
| 17 | 71 | 83 | 4.23 | 3.98 |
| 18 | 60 | 70 | 3.95 | 3.35 |
| 19 | 71 | 85 | 4.16 | 3.15 |
| 20 | 60 | 68 | 3.63 | 3.41 |
| 21 | 53 | 68 | 4.21 | 3.38 |
| 22 | 71 | 88 | 4.88 | 4.40 |
| 23 | 75 | 91 | 4.51 | 3.49 |

It is seen that reinforcing effects can be attained by incorporation of fibers. In runs Nos. 17 to 20, the method of the present invention is worked by using various dispersants. Even when other dispersants are used instead of the dispersant $a$ of the present invention, the effect of improving the workability can be tentatively attained, but various disadvantages or demerits hardening of concrete is retarded, and from removal is first possible after 3 days. The dispersant $e$ can be used substantially similarly to the dispersant $a$. Accordingly, the dispersant $a$ or $e$ is most suitable, and other dispersants are defective and cannot be put into practical use.

Run No. 21 illustrates that the improvement of the workability attained by the method of the present invention is excellent in comparison with the improvement of the workability attained by the use of fly ash. Run No. 22 indicates that with increase of the amount incorporated of steel fibers, the amount of the cement dispersant should be increased. Run No. 23 illustrates that even if steel fibers not uniform in the wave configuration are used, the method of the present invention can be effectively applied and that if the shape or configuration of the fibers is changed, also the necessary amount of the cement dispersant is changed.

EXAMPLE 4

Final compositions and properties of fresh mortars are shown in Table 9, the mixing methods are shown in Table 10, and mechanical characteristics of hardened mortars are shown in Table 11.

Table 9

| | | | Final Compositions and Properties of Fresh Mortars in Example 4 | | | | | | | |
|---|---|---|---|---|---|---|---|---|---|---|
| Run No. | W/C (%) | S/A (%) | C Kg/m$^3$ | W Kg/m$^3$ | S Kg/m$^3$ | F kind | F Kg/m$^3$ | D kind | D %xC | Air Content (%) | Final Slump (cm) |
| 24 | 40 | 50 | 1030 | 413 | 513 | n | 50 | a | 0.42 | mixing impossible | |
| 25 | 40 | 50 | 1030 | 416 | 517 | n | 50 | — | —    | 3.2 | 3.7 |
| 26 | 40 | 50 | 1042 | 418 | 519 | n | 51 | a | 0.42 | 2.9 | 10.5 |

Table 10

Mixing Methods in Example 4

| Run No. | Order of Charging of Ingredients | Method of Addition of Dispersant | Mixer |
|---|---|---|---|
| 24 | S,F $\xrightarrow{0.5\ \text{minute}}$ + C $\xrightarrow{0.5\ \text{minute}}$ + W + D $\xrightarrow{3\ \text{minutes}}$ | simultaneous addition | Z |
| 25 | mixing impossible S,C,W,D $\xrightarrow{1\ \text{minute}}$ + F $\xrightarrow{2\ \text{minutes}}$ | " | Z |

Table 10-continued

Mixing Methods in Example 4

| Run No. | Order of Charging of Ingredients | Method of Addition of Dispersant | Mixer |
|---|---|---|---|
| 26 | S,C,W,D $\xrightarrow{1 \text{ minute}}$ + F $\xrightarrow{2 \text{ minutes}}$ | " | Z |

Table 11

Mechanical Characteristics of Hardened Mortars in Example 4

| Run No. | Flexural Strength (7 days, Kg/cm²) | Compression Strength (7 days, Kg/cm²) | Deformability (7 days, ton . mm) |
|---|---|---|---|
| 24 | — | — | — |
| 25 | 62 | 255 | 2.01 |
| 26 | 70 | 344 | 2.28 |

From the foregoing results, it will readily be understood that the method of the present invention can be effectively applied also when glass fibers are incorporated.

What is claimed is:

1. In a method for preparing a moldable cementitious mixture by mixing in a mixing vessel hydraulic cement, aggregate for cement, fibers and water, the improvement which comprises the step of: mixing a salt of β-naphthalenesulfonic acid-formaldehyde high condensate in the mixture prior to mixing either the fibers or the cement with the other ingredients of the mixture, the amount of said condensate added to the mixture being an amount effective to prevent the formation of fiber balls in the mixture and to disperse the fibers uniformly in the mixture whereby to improve the physical properties of the molded product made of the mixture.

2. A method as set forth in claim 1 in which said salt of β-naphthalenesulfonic acid-formaldehyde high condensate is dissolved in water when it is added to the other ingredients.

3. A method as set forth in claim 1 in which said salt of β-naphthalenesulfonic acid-formaldehyde high condensate is added separately from the other ingredients of the mixture.

4. A method as set forth in claim 1 in which said salt of β-naphthalenesulfonic acid-formaldehyde high condensate is added after the cement has been mixed with water.

5. A method as set forth in claim 1 in which the fibers are the final ingredient added to the mixture.

6. A method as set forth in claim 1 in which the cement is the final ingredient added to the mixture, and the mixing is performed in a tilting mixer.

7. In a method for preparing a moldable cementitious mixture by mixing in a mixing vessel hydraulic cement, aggregate for cement, fibers and water, the improvement which comprises the step of: mixing a salt of β-naphthalenesulfonic acid-formaldehyde high condensate in the mixture substantially simultaneously with mixing all the other ingredients of the mixture, the amount of said condensate added to the mixture being an amount effective to prevent the formation of fiber balls in the mixture and to disperse the fibers uniformly in the mixture whereby to improve the physical properties of the molded product made of the mixture.

8. A method as set forth in claim 7 in which said salt of β-naphthalenesulfonic acid-formaldehyde high condensate is dissolved in water when it is mixed with the other ingredients.

9. A method as set forth in claim 7 in which said salt of β-naphthalenesulfonic acid-formaldehyde high condensate is added separately from the other ingredients of the mixture.

10. In a method for preparing a moldable cementitious mixture by mixing in a mixing vessel hydraulic cement, aggregate for cement, fibers and water, the improvement which comprises the step of: after forming said mixture, adding to and mixing in said mixture a salt of β-naphthalenesulfonic acid-formaldehyde high condensate in an amount effective to prevent the formation of fiber balls in the mixture and to disperse the fibers uniformly in the mixture whereby to improve the physical properties of the molded product made of the mixture.

* * * * *